United States Patent [19]

Tomikawa

[11] 3,894,477

[45] July 15, 1975

[54] FOLLOW-UP CONTROL DEVICE

[75] Inventor: Hisao Tomikawa, Takatsuki, Japan

[73] Assignee: Tsubakimoto Chain Co., Ltd., Osaka, Japan

[22] Filed: Mar. 21, 1973

[21] Appl. No.: 343,396

[30] Foreign Application Priority Data
Mar. 22, 1972  Japan.............................. 47-28077

[52] U.S. Cl. ........................ 91/355; 91/275; 92/10; 92/12
[51] Int. Cl. ...................... F15b 11/15; F15b 15/22
[58] Field of Search ............. 92/12, 11, 10; 91/275, 91/355

[56]  References Cited
UNITED STATES PATENTS

| | | | |
|---|---|---|---|
| 2,580,751 | 1/1952 | Fletcher | 92/11 |
| 2,962,001 | 11/1960 | Morton et al. | 92/11 |
| 3,172,338 | 3/1965 | Ackerman | 92/11 |
| 3,463,036 | 8/1969 | O'Connor | 92/11 |
| 3,518,829 | 7/1970 | Kamner | 92/11 |

Primary Examiner—Paul E. Maslousky
Attorney, Agent, or Firm—Woodhams, Blanchard and Flynn

[57] ABSTRACT

A follow-up control device comprising a pneumatic cylinder connected in series or parallel with a hydraulic cylinder for controlling the movement of a load device relative to a further device, such as for transferring an article or commodity from a load device onto the hanger of a movable conveyor. The pneumatic cylinder functions as the power source for moving the load device, and the hydraulic cylinder functions as a speed control for controlling the speed of movement of the load device. The hydraulic cylinder is coupled with a substantially closed hydraulic circuit for controlling the movement of the load.

6 Claims, 5 Drawing Figures

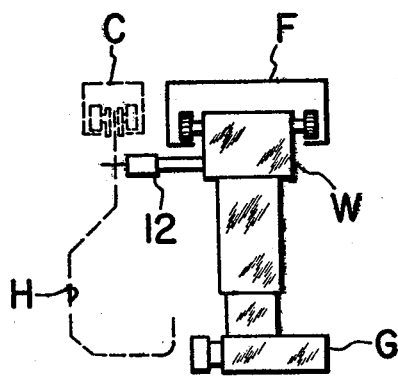
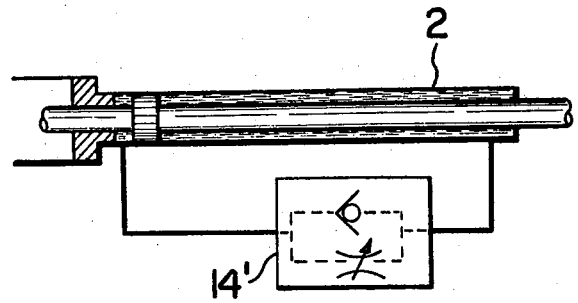
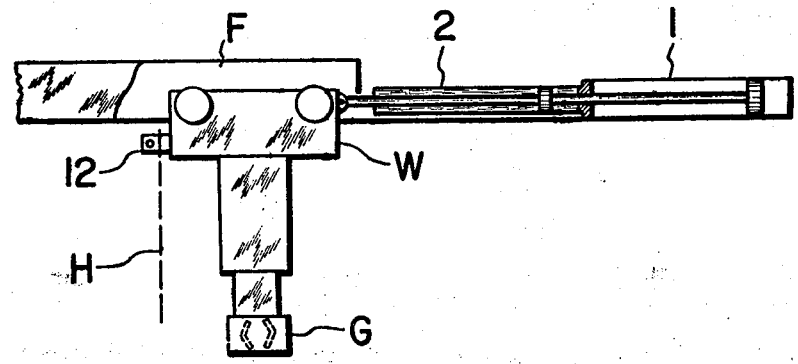
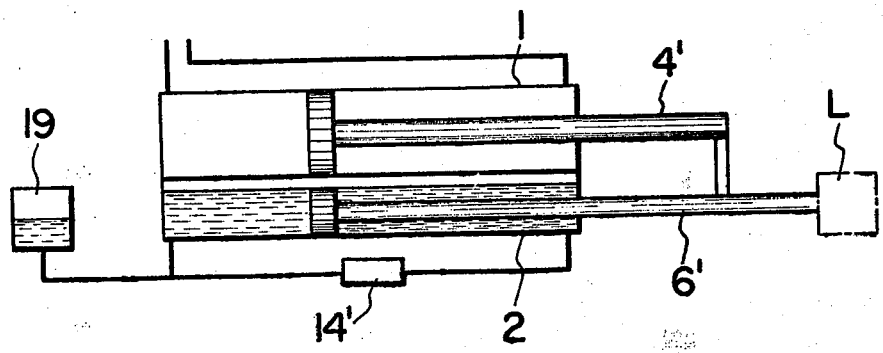

FOLLOW-UP CONTROL DEVICE

FIELD OF THE INVENTION

This invention relates to a follow-up control device for controlling the movement of a load relative to a further device, such as the hanger of a conveyor, and specifically includes a pneumatic cylinder used as a power source and connected to a hydraulic cylinder used as a speed control.

BACKGROUND OF THE INVENTION

The present invention relates to a follow-up control device for controlling and enabling the performance of operations relating to a moving object, such as relating to the transferring of articles or commodities to the hangers of a running conveyor. Conventionally, most devices of this type have utilized a combined electric-hydraulic servomechanism associated therewith for controling the operation thereof. However, while systems of this type result in extremely high accuracy, nevertheless such systems are extremely costly due to the equipment involved and often result in a much higher degree of accuracy than is required.

Accordingly, it is an object of the present invention to provide a follow-up control device which can be used as a substitute for conventional electric-hydraulic servomechanisms in those use situations where extreme accuracy is not required. Further, it is an object of the present invention to provide a follow-up control system which is inexpensive and mechanically simple, is reliable in operation, and can be successfully utilized for controlling the movement and/or transporting of a movable object.

The present invention specifically includes a follow-up control device which includes a pneumatic cylinder connected in series or parallel with a hydraulic cylinder, the pneumatic cylinder being used as the power source and the hydraulic cylinder being used for speed control. The hydraulic cylinder is associated with a substantially closed hydraulic system containing a flow rate control device which is appropriately actuated by signals generated by a detecting mechanism associated with the movable load or object for controlling the speed and movement thereof.

BRIEF DESCRIPTION OF THE DRAWINGS

FIG. 2 is an end elevational view of a movable transport system usable with the control device illustrated in FIG. 1.

FIG. 3 is a side elevational view of the apparatus of FIG. 2 and illustrating the control device associated therewith.

FIG. 4 illustrates a modified embodiment of the hydraulic circuit associated with the control device of the present invention.

FIG. 5 illustrates still a further embodiment of the control device of the present invention.

DETAILED DESCRIPTION

Figure 1:
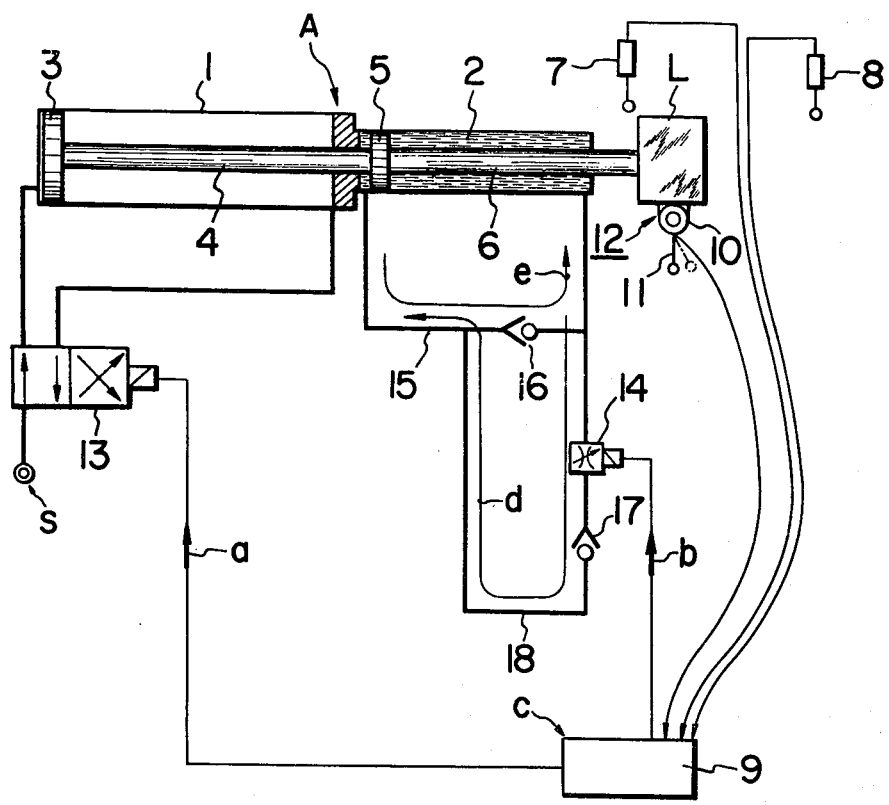
FIG. 1 illustrates the circuit construction of a first embodiment of the present invention.

FIG. 1 illustrates therein an embodiment of the control device A constructed according to the present invention. The control device includes an air cylinder 1 and a hydraulic cylinder 2 fixedly connected in series with one another. Cylinders 1 and 2 have piston rods 4 and 6, respectively, slidably supported therein and disposed in axial alignment with one another, which rods are fixedly connected together. The rods 4 and 6 in turn respectively have pistons 3 and 5 mounted thereon, which pistons are suitably slidably supported within the cylinders 1 and 2, respectively. The free end of the rod 6 is fixedly connected to a movable object or load L, which load is designed for reciprocating movement between predetermined limits. Limit switches 7 and 8 are provided for detecting the extremities of the stroke of the load L. The limit switches 7 and 8, when actuated by the load L, emit digital signals which are transmitted to a control unit 9. The load L also has a position detector 12 mounted thereon, which detector 12 includes a swingable detecting rod 11 mounted for swinging movement about the body 10. The detecting rod 11 is located to detect the position of the load L with respect to an object which is to be followed, which object when it contacts and moves the rod 11 causes the detecter 12 to emit an analogue signal which is submitted to the control unit 9.

Considering now the circuit associated with the hydraulic cylinder 2, same includes a flow conduit or passage 15 connecting the two oil chambers which are formed on opposite sides of the piston 5. The conduit 15 contains a conventional one-way check valve 16 associated therewith, which check valve enables free flow therethrough only in the direction indicated by the arrow $e$, which flow results in the pistons 5 and 6 being moved leftwardly in FIG. 1.

The hydraulic circuitry associated with cylinder 2 also includes a conduit or passage 18 connected in parallel with the one-way check valve 16 for permitting bypassing of same. The passage 18 also includes a conventional one-way check valve 17 associated therewith, which check valve is effective in the opposite direction from the check valve 16 so that free flow will occur through the passage 18 only in the direction indicated by the arrow $d$. The passage 18 also has an adjustable flow control valve 14 associated therewith for controlling flow through the passageway 18. The valve 14 is shiftable in a conventional manner, such as by means of a solenoid, between a closed position wherein it completely prevents flow through the passage 18 and an open position wherein flow through the passage 18 is permitted. Further, the flow control valve 14 specifically includes an adjustable orifice or restriction associated therewith, which, when the valve is in the open position, permits the cross-sectional flow area to be selectively varied so that the flow through the passage 18 can thus be selectively restricted to a desired rate. The shifting of the flow control valve 14, and specifically the solenoid associated therewith, is controlled by means of signals $b$ as received from the control unit 9.

The flow of air to and from the air cylinder 1 is suitably controlled by a conventional shiftable four-way valve 13, which valve is also normally solenoid operated. The position of the valve 13 thus controls the directional movement of the piston 3 associated with the cylinder 1. The control valve 13 is also suitably controlled and shifted by means of signals $a$ as received from the control unit 9.

FIGS. 2 and 3 illustrate therein an example of a situation utilizing the follow-up control device of the present invention. In FIG. 2, the equipment moves forwards and backwards with respect to the drawing, whereas FIG. 3 is a side view of FIG. 2 and the equipment thus moves rightwardly and leftwardly with respect to the drawing. The object of the equipment illustrated in FIGS. 2 and 3 is to transfer an article or commodity grasped by a transferring section G to a hanger H attached to a running conveyor C. The transfer section G is mounted on a bogie W, which bogie W corresponds to the load L in FIG. 1, the bogie being slidably mounted within a fixed guide frame F. The bogie W and the transfer section G are movable parallel to and directly adjacent the conveyor C over a short path of travel thereof so as to enable the article or commodity to be suitably transferred from the section G to a hanger H. To permit the appropriate alignment of the section G and the hanger H, and the transfer of the article or commodity therebetween, the equipment illustrated in FIGS. 2 and 3 is provided with the follow-up device A of FIG. 1 associated therewith for controlling the movement of the bogie W. For this purpose, the cylinders 1 and 2 are connected in series with one another and in series with the bogie W, as illustrated in FIG. 3, for causing a follow-up movement of the bogie to permit same to be moved directly adjacent a hanger H to facilitate transferring of the article or commodity from the section G to the hanger H. Further, the detector 12 is suitably mounted on the bogie W so that the rod 11 thereof will be contacted by the hanger H when the hanger is positioned adjacent the bogie to thus initiate the follow-up and transfer operation.

The equipment is also normally provided with a suitable control switch, such as a weight responsive switch or a conventional limit switch, associated with the transferring section G so as to indicate when an article or commodity is mounted thereon. This control switch (not shown) is activated only when a suitable article or commodity is mounted on the system, whereupon it emits a signal to the control unit 9 for activating the overall system.

Considering now the operational sequency of the present invention, the follow-up control device A is normally maintained in its retracted position as illustrated in FIGS. 1 and 3. The system is maintained in this retracted position in an inactive state so long as the control switch associated with the bogie W or transfer section G indicates that no article or commodity is mounted thereon. Further, when in its retracted position, the load L or bogie W is disposed in engagement with the limit switch 7.

When an article or commodity to be transferred has been grasped or engaged by the transfer section G of the bogie W, then an appropriate signal is sent to the control unit 9, as represented by the signal $c$ in FIG. 1. This thus activates the overall system. The limit switch 7 as activated by the load L or bogie W also sends a signal to the control unit 9, which control unit 9 in turn emits a signal $a$ to the air control valve 13 causing same to be switched into the position illustrated in FIG. 1. The extension end (leftward end in FIG. 1) of the air cylinder 1 is thus placed in communication with a suitable source S of pressurized air, which source S may comprise a conventional motor-compressor unit. The compressed air supplied to the extension end of cylinder 1 tends to move the combined piston rods 4 and 6 outwardly away from their retracted positions, but any such movement away from the retracted position is prevented since the hydraulic cylinder 2 and the circuitry associated therewith is maintained in a substantially locked position.

More specifically, the hydraulic system and the hydraulic cylinder contain therein a predetermined quantity of hydraulic fluid. The flow of hydraulic fluid through passage 15 from the retraction chamber (rightward end of FIG. 1) of cylinder 2 to the extension chamber (leftward end in FIG. 1) is prevented by the one-way check valve 16. Further, the control valve 14 is normally maintained in its closed position, so that flow through the passage 18 is also positively prevented. Thus, while the power cylinder 1 is activated, nevertheless any movement of the system away from its retracted position is positively prevented by the hydraulic cylinder 2 being maintained in a locked position.

When a hanger H associated with the conveyor C moves into a position adjacent the bogie W, then the hanger H contacts the detector 12 and moves the detector rod 11. The detector 12 thus emits a signal which is supplied to the control unit 9, which signal indicates the presence of the hanger H adjacent the bogie W. The signal emitted by the detector 12, which signal is proportional to the positional difference between the hanger H and the bogie W, is then amplified by the control unit 9 and is then submitted as signal $b$ to the control valve 14, thereby causing the control valve 14 to move to its open position. The adjustable flow restriction device associated with the flow control valve 14 is thus disposed in communication with the passage 18 so as to permit for controlled flow of hydraulic fluid therethrough.

As the flow control valve 14 is opened, the pressurized air which is supplied to the extending end of the cylinder 1 causes the piston 3 and piston rod 4 to move away from its retracted position (causes it to move rightwardly in FIG. 1), which in turn causes a corresponding extension of the piston rod 6 associated with the cylinder 2. Hydraulic fluid is thus displaced from the retraction chamber (the rightward chamber in FIG. 1) into the passage 18, whereupon the fluid flows through the restriction associated with the valve 14 and through the one-way check valve 17 and then into the extension end (leftward end in FIG. 1) of the cylinder 2. This flow is graphically indicated by the arrow $d$ illustrated in FIG. 1. This movement of the pistons and piston rods causes a corresponding movement of the bogie W or load L so that same is moved away from the limit switch 7 in a direction toward the limit switch 8. The bogie thus starts its follow-up operation wherein it begins to move along with the movable hanger H. During this follow-up operation wherein the bogie W and hanger H are moving along and adjacent one another in side-by-side relation, the article or commodity on the transfer section G is laterally transferred onto the hanger H.

After the transfer operation has been completed, the bogie W reaches its fully extended position, whereupon the load L or bogie W contacts the limit switch 8. Alternately, a signal may be emitted from a suitable switch associated with the bogie W or transfer section G after the commodity transfer has been completed. Accordingly, when this signal is received, either from a commodity transfer completion switch or from the limit switch 8, then this signal is supplied to the control unit 9 which then emits a signal $a$ to the air valve 13 causing same to be shifted to its other position (not shown). The pressurized air from the source S is then supplied through valve 13 to the opposite end of the cylinder 1, namely the retraction chamber (the rightward end in FIG. 1). The pressurized air then causes the piston 3 to return toward its original retracted position (leftwardly in FIG. 1), which in turn causes a corresponding retraction of the piston 5 associated with the hydraulic cylinder 2. This causes the hydraulic fluid to flow from the extension chamber (the leftward chamber in FIG. 1) through the passage 15 and through the one-way check valve 16 into the retraction chamber (the rightward chamber in FIG. 1). Further, the one-way check valve 16 offers less resistance to the returning flow of fluid than is created by the restricted flow control valve 14, whereupon the return of the bogie W from its extended to its retracted position thus occurs at a much more rapid rate. When the bogie W (or load L) reaches its fully retracted position, it again contacts the limit switch 7 which emits an appropriate signal indicating completion of a complete cycle. Further, the flow control valve 14 is also appropriately returned to its closed position, either at the time the retraction cycle is initiated or at the time the retraction cycle is completed. The overall system is thus in position so as to be activated when a further article or commodity is mounted on the transfer section G, so as to thus be able to perform a further transfer cycle as explained above.

Referring to FIG. 4, there is illustrated therein a modified hydraulic circuit adapted for coaction with the hydraulic cylinder 2. The modified circuit of FIG. 4 again incorporates therein an adjustable flow rate control valve 14' which functions in a manner equivalent to the valve 14 and the one-way check valve 16 illustrated in FIG. 1. The flow rate control valve 14' permits the hydraulic fluid to pass therethrough when the cylinder is moving in both directions of travel, namely both leftwardly and rightwardly. However, when the piston and piston rods are being extended, then the valve 14' acts as a flow restriction device for controlling the rate of extension. However, when the piston associated with the hydraulic cylinder is being retracted, then the flow control valve 14' is in a fully open position to thus permit rapid return of the cylinder to its fully retracted position. However, the system of FIG. 1 is preferred since it offers a greater practical advantage because of the relatively higher resistance of the flow rate control valve itself.

FIG. 5 illustrates still a further modification of the present invention wherein the pneumatic cylinder 1 and the hydraulic cylinder 2 are connected in parallel with one another. In this embodiment, the piston rods 4' and 6' are not directly coaxially aligned, but rather are disposed parallel to one another and are fixedly interconnected by any desirable intermediate interconnecting structure. Further, in this embodiment, the hydraulic circuitry associated with the cylinder 2 is provided with a reservoir or tank 19 for storing therein hydraulic fluid since the quantity of fluid contained within the cylinder 2 varies during the movement of the piston since the piston rod 6' extends through only one of the cylinder chambers.

The operation of the system illustrated in FIG. 5, other than the above-described distinctions, is in all other respects identical to the operation of the system illustrated in FIGS. 1-3.

According to the present invention, the air cylinder 1 is pushed to only one side during the follow-up operation, so that the cylinder does not follow-up when the hanger H falls behind the movement of the conveyor C. Rather, the air cylinder stops for a selected time so that the hanger H catches up with the conveyor C so as to permit the desired transfer operation.

As described above, the use of an air cylinder for the power source and a hydraulic cylinder for the speed control, as in the present invention, thus offers a characteristic device which is not only very economical, due to the avoidance of a need for a costly hydraulic and/or electro-hydraulic system, but is also extremely simple in construction and operation.

The embodiments of the invention in which an exclusive property or privilege is claimed are defined as follows:

1. In combination, a follow-up control device connected to a reciprocating article transfer unit for controlling the operation thereof, comprising:

power means drivingly connected to said transfer unit for moving same;

speed control means coacting with said power means for limiting the rate at which said transfer unit is moved in at least one direction;

said power means including pneumatic cylinder means having a first cylinder housing and first piston means slidably disposed within and movable relative to said cylinder housing, said first piston means including a first piston rod slidably extending outwardly from at least one end of said first cylinder housing;

said speed control means including hydraulic cylinder means having a second cylinder housing and second piston means slidably supported on and movable relative to said second cylinder housing, said second piston means including a second piston rod slidably extending outwardly from at least one end of said second cylinder housing;

means coacting between an operatively connecting said first and second piston rods for causing synchronous movement thereof;

means associated with one of said piston rods for fixedly interconnecting same to said transfer unit;

hydraulic circuitry means associated with said hydraulic cylinder means for providing for flow of hydraulic fluid between the opposite ends of said second cylinder housing in response to movement of said second piston means, said circuitry means including flow control valve means associated therewith and defining a restricted flow passage for controlling the rate at which fluid may flow therethrough from one end of said second cylinder housing to the other end of said second cylinder housing, whereby said flow rate through said flow control valve means restricts the rate of movement of said second piston means, which in turn restricts the rate of movement of said first piston means;

said flow control valve means being shiftable between open and closed positions, said flow control valve means being normally maintained in said closed position wherein flow from said one end of said second cylinder housing to said other end thereof is prevented, movement of said flow control valve means into said open position permitting controlled flow from said one end of said second cylinder housing to said other end thereof;

a control device operatively associated with said flow control valve means for activating same to cause movement thereof from said normally closed position into said open position; and detecting means mounted on the transfer unit for detecting the presence of an object which is moving relative to said transfer unit, said detecting means when sensing said object activating said control device to cause said valve means to be moved into said open position to unlock the hydraulic cylinder means to permit controlled movement of the transfer unit.

2. A combination according to claim 1, wherein said circuitry means includes means associated therewith for permitting return flow of fluid from said other end of said second cylinder housing to said one end of said second cylinder housing at a rate substantially greater than the rate at which fluid is permitted to flow from said one end toward said other end.

3. A combination according to claim 1, wherein said circuitry means includes first passageway means providing fluid communication between the opposite ends of said second cylinder housing, said flow control valve means being associated with said first passageway means for permitting restricted flow therethrough at a controlled rate as said fluid flows in a first direction from said one end of said second housing to said other end of said second housing, said first passageway means further including one-way check valve means associated therewith for preventing flow of fluid through said first passageway means in a second direction which is opposite said first direction, said circuitry means including second passageway means disposed substantially parallel to said first passageway means and providing communication between the opposite ends of said second housing, said second passageway means including one-way check valve means associated therewith for positively preventing flow of fluid from said one end of said housing to said other end thereof while permitting unrestricted fluid flow in a direction from said other end of said housing toward said one end thereof.

4. A combination according to claim 3, further including shiftable valve means associated with said pneumatic cylinder means for controlling the flow of pressurized air thereto, said shiftable valve means being selectively positionable in a first position for supplying pressurized air to one end of said first cylinder housing for moving said first piston means in a first direction and being shiftable into a second position for supplying air to the other end of said second cylinder housing for moving said first piston means in a second direction which is opposite said first direction, and controlling means responsive to the movement of said transfer unit for effecting shifting of said shiftable valve means for causing reversal in the direction of travel of said transfer unit.

5. A controlled transfer apparatus for use with a device moving in a first direction along a first path to permit transfer of an article between said device and said apparatus, comprising:

guide means defining a second path which is spaced from but substantially parallel to said first path;

carriage means coacting with said guide means for reciprocating movement along said second path, said carriage means having means associated therewith for permitting transfer of an article between said device and said carriage means;

power means drivingly connected to said carriage means for reciprocating same, said power means including pneumatic cylinder means having a first cylinder housing and first piston means slidably disposed within and movable relative to said first cylinder housing, said first piston means including a first piston rod slidably extending outwardly from at least one end of said first cylinder housing;

speed control means coacting with said power means for limiting the rate at which said carriage means is moved in at least said first direction, said speed control means including hydraulic cylinder means having a second cylinder housing and second piston means slidably supported on and movable relative to said second cylinder housing, said second piston means including a second piston rod slidably extending outwardly from at least one end of said second cylinder housing;

means coacting between and operatively connecting said first and second piston rods for causing synchronous movement thereof;

means associated with one of said piston rods for fixedly interconnecting same to said carriage means;

first valve means associated with said pneumatic cylinder means for controlling the flow of air to and from said first cylinder housing;

second valve means associated with said hydraulic cylinder means for controlling the flow of hydraulic fluid between the opposite ends of said second cylinder housing, said second valve means being normally maintained in a closed positin for preventing flow of fluid between the opposite ends of said second cylinder housing and being movable into an open position for permitting controlled flow of fluid from one end of said second cylinder housing to the other end thereof to permit controlled movement in said first direction, said hydraulic cylinder means being positively locked in a stationary condition when said second valve means is closed irrespective of the energization of the pneumatic cylinder means; and detecting means mounted on said carriage means for detecting the presence of said device and for activating said second valve means to move same into its open position when said device is detected.

6. An apparatus according to claim 5, wherein said detecting means includes a swingable detecting member mounted on said carriage means and projecting transversely therefrom towards said first path so as to be disposed for contact by said device.

* * * * *